(No Model.)
W. BARRETT.
Straw Cutter.
No. 237,466. Patented Feb. 8, 1881.
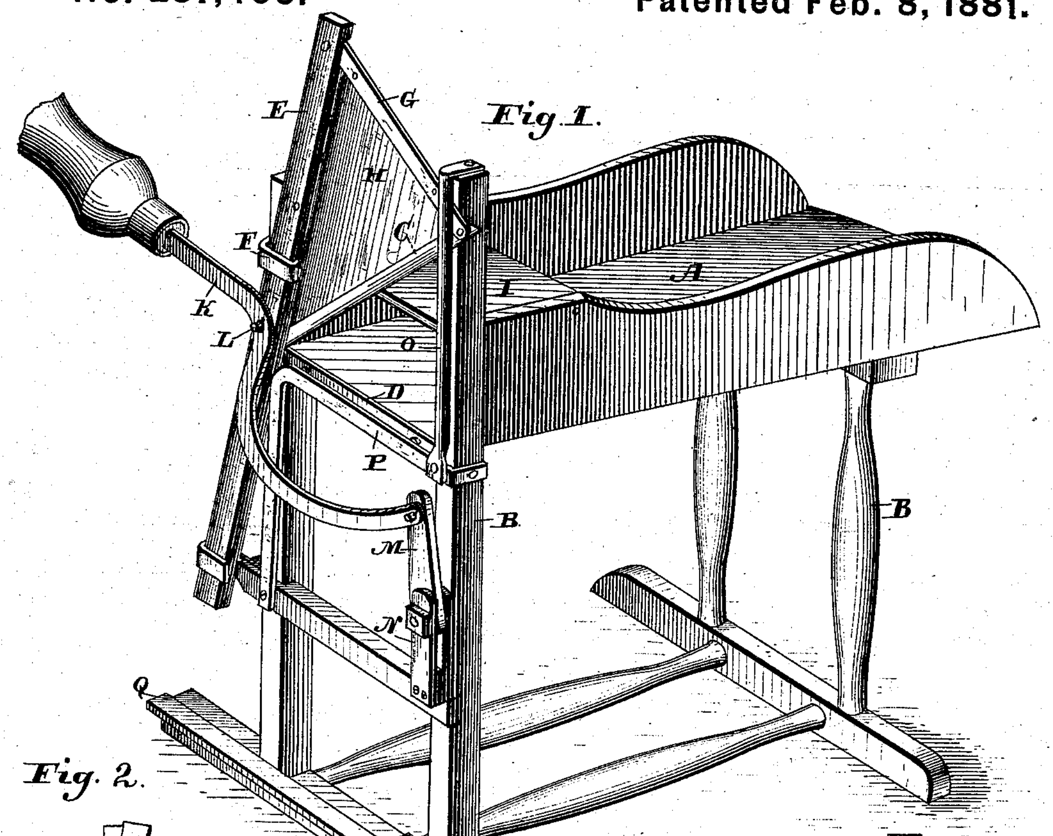
Fig. 2.
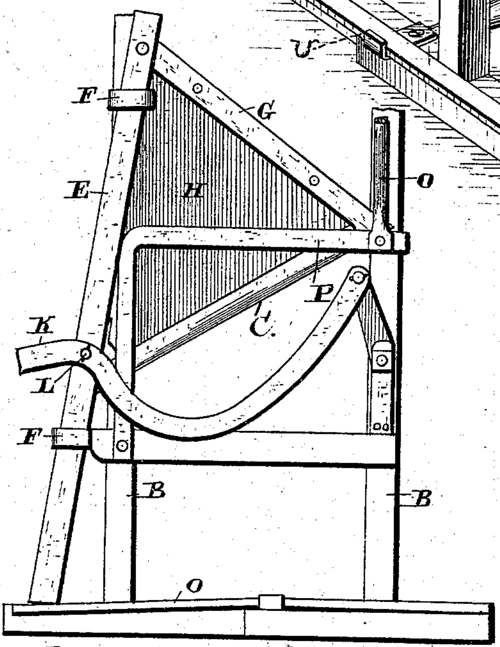
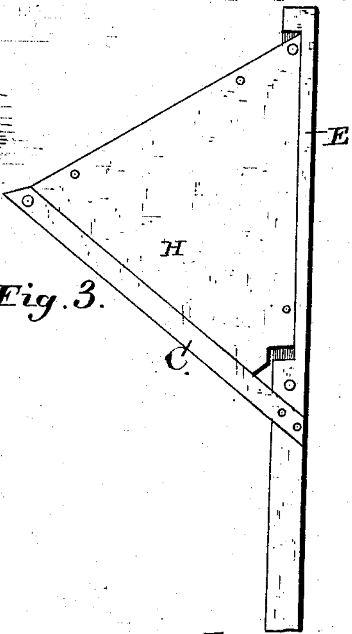
Fig. 3.
Attest:
J. Henry Kaiser
J. A. Rutherford
Inventor:
William Barrett,
By James L. Norris.
Att'y.
N. PETERS, PHOTO-LITHOGRAPHER, WASHINGTON, D. C.

UNITED STATES PATENT OFFICE.

WILLIAM BARRETT, OF SEDALIA, MISSOURI.

STRAW-CUTTER.

SPECIFICATION forming part of Letters Patent No. 237,466, dated February 8, 1881.

Application filed December 1, 1880. (No model.)

*To all whom it may concern:*

Be it known that I, WILLIAM BARRETT, a citizen of the United States, residing at Sedalia, in the county of Pettis and State of Missouri, have invented new and useful Improvements in Hay and Straw Cutters, of which the following is a specification.

This invention relates to improvements on the straw-cutter for which Letters Patent were granted December 29, 1857, No. 18,946; and the object of my present invention is to render the machine more effective in operation.

The invention consists in a novel improvement in the structure, and will be fully hereinafter described in detail, and specifically pointed out in the claims.

In the drawings, Figure 1 is a perspective view of a hay and straw cutting machine constructed in accordance with my invention, the reciprocating knife being shown in an elevated position. Fig. 2 is a front elevation of the same with the knife depressed, and Fig. 3 is a rear view of the reciprocating knife and knife-bar detached from the machine.

The letter A indicates the feed-trough, which is supported upon a suitable frame, B, as is usual in this class of machines. C refers to the reciprocating knife, which is arranged to work at the forward end of the feed-trough, and D indicates the stationary knife, which is secured to the front end of the feed-trough in position to act in conjunction with the reciprocating knife or cutter. The reciprocating knife is set at about an angle of forty-five degrees, and is secured, at its lower end, to an inclined knife-bar, E, arranged to move, through guides F F, upon the front end of the main frame of the machine.

An inclined brace-bar, G, connects the upper end of the reciprocating knife with the knife-bar, and the triangular space thus formed between the knife-bar, knife, and brace is closed by a sheet-metal plate, H, so that in lifting the knife it will be impossible for ends of the hay or straw to be extended and raised by the ascending knife. As a means for holding down the hay or straw I arrange within the trough, just in rear of the knife, a swinging board, I, which will rest upon the hay or straw with a yielding pressure as the same is fed along the trough.

The sickle-shaped handle K, which is employed for reciprocating the inclined bar carrying the reciprocating knife, is pivoted to the knife-bar, as at L, and connected at one of its ends with the frame of the machine by a toggle-joint, M, consisting of a link or bar pivoted at one end to the said handle, and pivoted at its other end in a recess formed between the machine-frame and a plate, N, the nut upon the pivot which passes through this plate being arranged upon the outer side of the plate, so that it will not work off from the pivot.

The guide-bar O for the reciprocating knife is secured at its upper end to one of the front standards of the main frame of the machine, and at its lower end is connected with the horizontal arm of a right-angle bar, P, which is fastened at its ends to the main frame. This right-angle bar P is arranged so as to leave a space in front of the stationary knife for the free movement of the reciprocating knife, the horizontal arm of said bar being in advance of the stationary knife, and the vertical arm thereof being in front of one of the standards of the main frame. The right-angle bar not only acts as a guide to the movements of the knife; but its horizontal arm also acts as a support to the projecting portions of the straw while being severed by the knife.

At the base of the machine is arranged a spring-bar, Q, in position to be acted upon by the knife-bar after the latter has been depressed, so as to take up the shock. This spring also serves to assist in starting the knife-bar in its upward movement by reason of its reactionary force. This spring is bolted to the base of the frame-work at one end, and is confined in a proper position by a clip, U, which also prevents any lateral movement of the spring and retains it in the path of the knife-bar E. As the sickle-shaped handle is operated the knife will be reciprocated, and will move up and down in an inclined path, so as to produce a draw-cut upon the hay or straw.

What I claim is—

1. The combination of the inclined knife C, with the inclined knife-bar E, the inclined brace G, the plate H, secured between the knife-bar, the knife, and the brace, the sickle-shaped or downwardly-curved handle K, the link M, pivoted within the stationary plate N by a pin or bolt, the transverse knife D, and the right-angle guide-bar P, having its horizontal arm arranged parallel to and at a short distance in front of the knife D, and subserving both as a guide to the knife and as a support to the ends of the straw while being severed, the said members being constructed and arranged substantially as and for the purpose described.

2. The right-angle bar P, having the sides of its horizontal and vertical arms attached to the vertical standards B, and its horizontal arm arranged parallel to and near the stationary knife D, to create an intervening space between the two and serve as a support to the projections of the straw while being severed, in combination with the vertical guide O, the inclined reciprocating knife C, the inclined knife-bar E, and the handle K, pivoted to the latter and extending in a curved path to and connected with the pivoted link M of the stationary plate N, the whole being constructed and arranged in the manner herein shown and described.

In testimony whereof I have hereunto set my hand in presence of two subscribing witnesses.

WILLIAM BARRETT.

Witnesses:

ED. QUILTY,
GEORGE W. BARRETT.